United States Patent
Olds

[19]

[11] Patent Number: 5,905,957
[45] Date of Patent: May 18, 1999

[54] METHOD AND APPARATUS FOR MANAGEMENT OF AUTOMATICALLY INITIATED COMMUNICATION

[75] Inventor: Keith Andrew Olds, Mesa, Ariz.

[73] Assignee: Motorola, Inc., Schaumburg, Ill.

[21] Appl. No.: 08/937,328

[22] Filed: Sep. 20, 1997

Related U.S. Application Data

[63] Continuation of application No. 08/563,244, Nov. 27, 1995, abandoned, which is a continuation of application No. 08/157,513, Nov. 26, 1993, abandoned.

[51] Int. Cl.⁶ .............................. H04Q 7/20; H04B 7/185
[52] U.S. Cl. .......................... 455/435; 455/427; 455/456; 455/13.1
[58] Field of Search .................................. 455/422, 427, 455/428, 432, 435, 456, 12.1, 13.1

[56] References Cited

U.S. PATENT DOCUMENTS

| | | | |
|---|---|---|---|
| 5,081,703 | 1/1992 | Lee ........................................ | 455/13.1 |
| 5,161,248 | 11/1992 | Bertiger et al. ........................ | 455/17 |
| 5,212,822 | 5/1993 | Fukumine et al. .................... | 455/33.1 |
| 5,218,716 | 6/1993 | Comroe et al. ....................... | 455/54.2 |
| 5,235,633 | 8/1993 | Dennison et al. .................... | 455/12.1 |
| 5,289,527 | 2/1994 | Tiedemann, Jr. ..................... | 379/59 |
| 5,305,466 | 4/1994 | Taketsugu ............................. | 455/33.1 |
| 5,552,795 | 9/1996 | Tayloe et al. ......................... | 455/12.1 |

FOREIGN PATENT DOCUMENTS

| | | |
|---|---|---|
| 0546758 | 12/1992 | European Pat. Off. . |
| 0526374 | 3/1993 | European Pat. Off. . |
| A288718 | 10/1989 | Germany . |

*Primary Examiner*—Nguyen Vo
*Attorney, Agent, or Firm*—Walter W. Nielsen; Sherry J. Whitney; Frank J. Bogacz

[57] ABSTRACT

A communication system (10) includes a population of mobile units (24) which communicate with a control station. Communications take place between the control station and the mobile units (24) so that the system (10) may gain knowledge about the mobile units' locations. The mobile units (24) occasionally initiate such communications automatically. The control station sends data defining a target area (72, FIG. 5) to the mobile units. The mobile units (24) reside in the target areas (72) when the target areas (72) are first assigned, but the mobile units (24) are free to move. The control station transmits broadcast signals to geographically spaced apart cells (36, FIG. 2). The broadcast signals convey current data identifying the service areas covered by the cells (36). The mobile units (24) automatically initiate communications when their assigned target areas (72) do not coincide with the service areas for the broadcast signals they can receive.

6 Claims, 7 Drawing Sheets

| BROADCAST DATA MESSAGE TABLE | | | |
|---|---|---|---|
| BEAM CENTER | CELL ID | ACCESS CHANNELS | STATS |
| — | — | — | — |
| — | — | — | — |
| ⋮ | ⋮ | ⋮ | ⋮ |
| — | — | — | — |

METHOD AND APPARATUS FOR MANAGEMENT OF AUTOMATICALLY INITIATED COMMUNICATION

This application is a continuation of prior application Ser. No. 08/563,244, filed Nov. 27, 1995, now abandoned, which is a continuation of prior application Ser. No. 08/957,513, filed Nov. 26, 1993, now abandoned.

TECHNICAL FIELD OF THE INVENTION

The present invention relates generally to communication systems and, more specifically, to communication systems in which communication automatically takes place between a control station and members of a population of mobile units from time to time.

BACKGROUND OF THE INVENTION

Communication systems, such as cellular radio telecommunication systems and others, may include system-related components and populations of mobile units. The mobile units may freely move throughout the regions covered by the communication systems. The system components include base units, repeaters, control stations, switching offices, and the like, and they are controlled by operators and providers of the communication systems. Members of the populations of mobile units may communicate with each other and perhaps with equipment coupled to the public switched telecommunications networks through the system components. The mobile units are typically controlled by customers or end users of the communication systems.

A communication system may benefit from occasional system-related communications taking place between system components and mobile units. System-related communication takes place to insure the reliable and efficient operation of the system. System-related communication is not intended to relay information to end users. Rather, system-related communication needs to take place between mobile units and system components so that the system can gain useful information, such as locations for mobile units and the like.

Mobile unit location knowledge can be beneficial for several reasons. If a system knows where a particular mobile unit is located, then the system can route calls for that mobile unit to only that location and conserve system capacity in other locations. This dramatically decreases the consumption of system resources and permits a communication system to handle many more calls than could be handled if calls were routed to all locations where a particular mobile unit might possibly reside. Furthermore, knowledge of mobile unit locations is important, since in some geopolitical jurisdictions communication operations may be prohibited by the lack of proper licensing arrangements. Moreover, rates charged to customers may vary depending upon the locations of mobile units when calls are made.

While system knowledge of mobile unit locations may be particularly beneficial, other types of system-related communications may also be valuable. For example, system reliability and operational efficiency may benefit from occasional system-related communications that reprogram mobile unit operating parameters, verify mobile unit programming, verify system integrity, and the like.

Regardless of the reason for engaging in system-related communications, determining when to engage in such communications poses a serious problem. End-users of the communication system might possibly initiate system-related communications from time to time, but this is not a desirable solution. End-user control of location information makes the communication system vulnerable to pirating of communication services, communication in unauthorized geopolitical jurisdictions, and unauthorized exploitation of rate differences between jurisdictions. Moreover, requiring end-users to initiate such communications imposes an unwanted burden on the end users and results in an unreliable solution. Some end-users will forget to initiate the system-related communications, causing the system to operate upon stale information. Other end-users will initiate system-related communications more frequently than necessary and thereby waste system resources.

System-related communications might possibly be tagged onto calls routed to and from a mobile unit. For example, during a call set-up operation the system may learn where the mobile unit is located. While this solution solves some of the problems, it is an incomplete solution. When a call is directed to a particular mobile unit, the system uses current information about the mobile unites location so that the incoming call or ringing signal can be transmitted only in the area where the mobile unit currently resides. However, this solution provides no way for the system to acquire valid mobile unit location information when a mobile unit moves a significant distance but then makes no prior outgoing call that would provide its location.

Desirably, system-related communications should take place automatically from time to time. That way the communication system's reliability and operational efficiency are not controlled by the vagaries of end-user actions. However, the problem of determining when to engage in system-related communications still remains. Desirably, such communications are not initiated by a mobile unit whenever the mobile unit powers up, because more system-related communications would take place than are needed and system resources would be wasted. Likewise, such communications should not be initiated upon some sort of timing schedule. If a timing schedule specified frequent system-related communications, more system-related communications would take place than are needed, and system resources would be wasted. If a timing schedule specified infrequent system-related communications, the system would become unreliable, because it would often operate upon stale information.

SUMMARY OF THE INVENTION

Accordingly, it is an advantage of the present invention that an improved method and apparatus for managing automatically initiated communications is provided.

Another advantage of the present invention is that location data triggers automatically initiated communications.

Another advantage of the present invention is that system components broadcast location information from time to time, and mobile units monitor the broadcasts to determine whether the system's old location knowledge remains valid.

Another advantage of the present invention is that the system may program and adjust parameters which influence the frequency of automatically initiated communications.

Another advantage of the present invention is that mobile units may have relatively low complexity and cost, because they are not required to determine their own locations.

The above and other advantages of the present invention are carried out in one form by a method of operating a mobile unit to determine when to automatically initiate communications with a control station. The method calls for receiving data that describe a known location for the mobile unit. A broadcast signal is then monitored. The broadcast signal conveys geographic data that describe a service area to which the broadcast signal is assigned. The position of the known location relative to this service area is determined. Data communication from the mobile unit is initiated in response to this relative position determination.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and wherein:

DETAILED DESCRIPTION OF THE PREFERRED EMBODIMENTS

Figure 1:
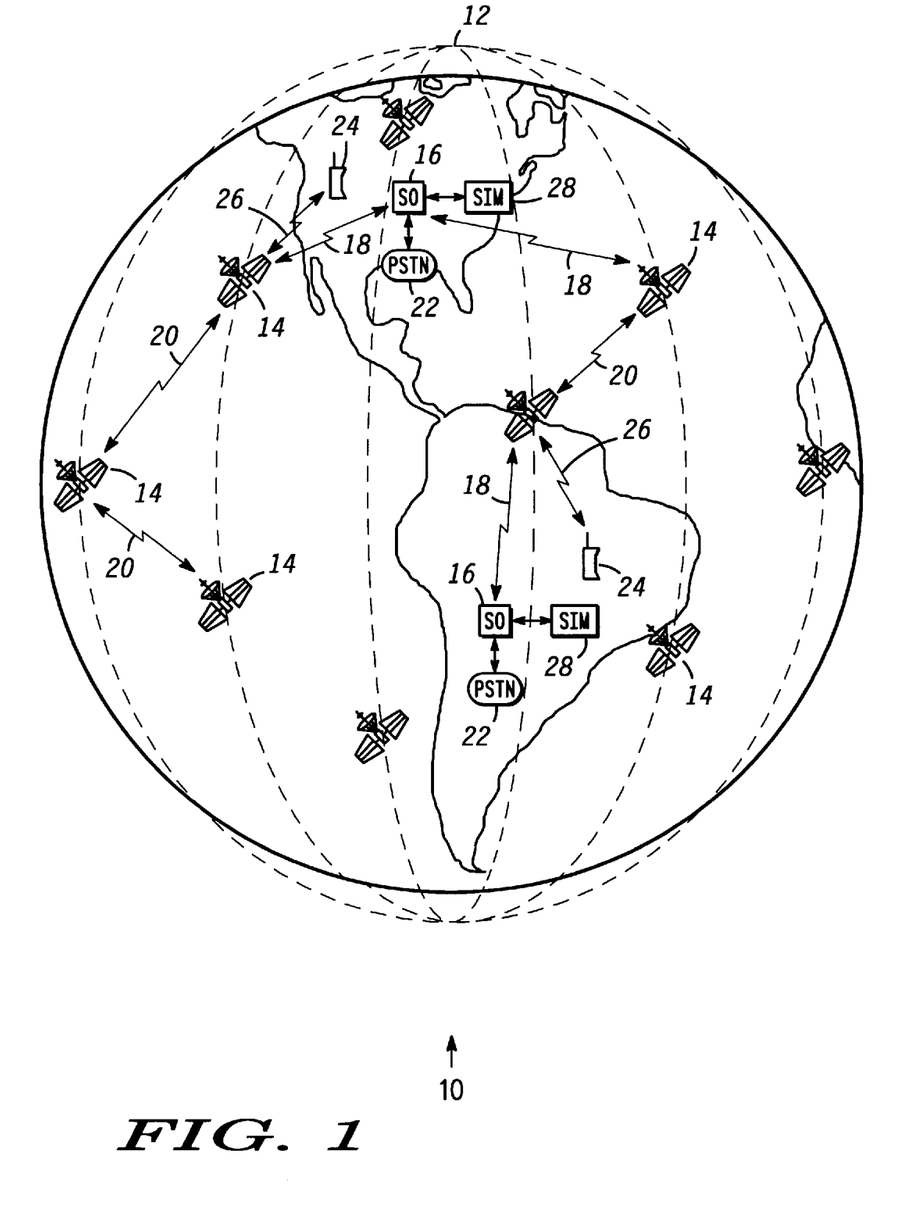
FIG. 1 shows a pictorial diagram of an environment within which a communication system may operate.

FIG. 1 shows a pictorial diagram of an environment within which a radio communication system 10 operates. System 10 includes a constellation 12 of satellites 14 placed in relatively low orbits around the earth. In the preferred embodiment, the configuration of constellation 12 allows at least one of satellites 14 to be within view of each point on the surface of the earth at all times.

Due to their low earth orbits, satellites 14 constantly move relative to the earth. In the preferred embodiments, satellites 14 move in orbits at an altitude in the range of 500–1000 Km above the earth. If, for example, satellites 14 are placed in orbits which are around 765 km above the earth, then an overhead satellite 14 travels at a speed of around 25,000 km/hr with respect to a point on the surface of the earth. Electromagnetic signals traveling at or near the speed of light between the surface of the earth and a satellite communication node 14 in such an orbit will require a propagation duration of 2–3 msec or more, depending on the satellite's angle of view. Moreover, electromagnetic signals traveling between the surface of the earth and a satellite 14 in such an orbit may experience a considerable Doppler component of frequency shift, the precise value of which is dependent on a source frequency and the satellite's angle of view.

System 10 additionally includes one or more switching offices (SOs) 16. SOs 16 reside on the surface of the earth and are in data communication with nearby ones of satellites 14 through RF communication links 18. Satellites 14 are also in data communication with one another through data communication links 20. Hence, through constellation 12 of satellites 14, an SO 16 may control communications delivered to any size region of the earth. However, the region controlled by each SO 16 is preferably associated with one or more specific geopolitical jurisdictions, such as one or more countries. SOs 16 couple to public switched telecommunication networks (PSTNs) 22, from which calls directed toward subscribers of system 10 may be received and to which calls placed by subscribers of system 10 may be sent.

System 10 also includes a population, with potentially millions of members, of mobile subscriber units 24. Mobile units 24 are configured to engage in communications with satellites 14 over portions of the electromagnetic spectrum that are allocated by governmental agencies associated with various geopolitical jurisdictions. Mobile units 24 communicate with nearby satellites 14 through communication links 26. System 10 accommodates the movement of mobile units 24 anywhere on or near the surface of the earth.

Any number of subscriber information managers (SIMs) 28 may also be included within system 10. Each SIM 28 may maintain a subscriber database that is relevant to only a discrete portion of the population of mobile units 24. The database may include information describing features associated with mobile units 24, rates to be associated with mobile units 24, current locations for mobile units 24, and the like. Each mobile unit 24 is assigned to one of SIMs 28, and that one SIM 28 is considered the "home" SIM 28 for the mobile unit 24. Each SO 16 may communicate with any SIM 28 through constellation 12, PSTN 22, or another communication path.

In general, system 10 is a network of nodes. Each mobile unit 24, satellite 14, SO 16, and SIM 28 represents a node of system 10. All nodes of system 10 are or may be in data communication with other nodes of system 10 through communication links 18, 20, and/or 26. In addition, all nodes of system 10 are or may be in data communication with other telephonic devices dispersed throughout the world through PSTNs 22. Furthermore, system 10 includes a control station and mobile units 24. Mobile units 24 are controlled by the subscribers of system 10. Control station includes the system components, including satellites 14, SOs 16, and SIMs 28. A control station is controlled and operated by the providers of system 10. When a mobile unit 24 communicates with control station, the precise system components involved may be located anywhere in the world, and the communications are routed to the target components through communication links 18, 20, and/or 26. Any one of these or other system components alone or one or more of these or other system components collectively are referred to as control station herein.

Communication services, including calls, may be set up between two mobile units 24 or between any mobile unit 24 and a PSTN phone number. Calls may be set up between any two locations on the earth, assuming appropriate licenses have been obtained in jurisdictions where the locations reside. Generally speaking, each mobile unit 24 engages in system communications with a control station, and particularly a nearby SO 16, during call setup and during a registration process, discussed below. The call setup communications take place prior to forming a communication path between a mobile unit 24 and another unit, which may be another mobile unit 24 or a PSTN phone number.

Figure 2:
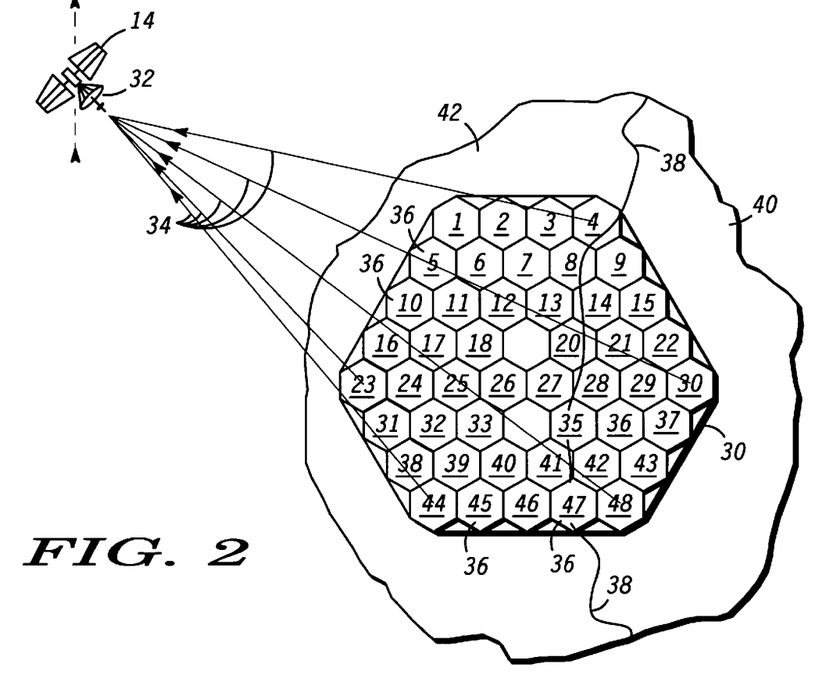
FIG. 2 shows a representation of a cellular pattern formed on the surface of the earth by a satellite portion of the communication system.

FIG. 2 shows a cellular footprint pattern 30 formed on the surface of the earth by a single satellite 14. Each satellite 14 includes a multibeam antenna 32. Each antenna 32 projects numerous discrete antenna beams or patterns 34 toward the earth's surface at numerous diverse angles away from its satellite 14. FIG. 2 shows a diagram of a resulting pattern of cells 36 that beams 34 form on the surface of the earth. Each beam 34 is associated with a cell 36 in a one-to-one correspondence. In the preferred embodiment of the present invention, all satellites 14 are configured substantially as depicted in FIG. 2. Thus, other satellites 14 (not shown) form other similar footprints (not shown). Desirably, a continuous blanket of cells 36 substantially covers the entire surface of the earth.

Each cell 36 within footprint 30 occupies a unique position within footprint 30. These positions are distinguished from one another through the use of a cell ID, listed as 1 through 48 in FIG. 2.

For clarity, the schematic diagram of FIG. 2 illustrates cells 36 and footprint 30 as being discrete, generally hexagonal shapes without overlap or gaps. However, those skilled in the art will understand that in actual practice equal strength lines projected by beams 34 from antennas 32 of satellites 14 may actually have a shape far different than a hexagonal shape, that antenna side lobes may distort the pattern, that some cells 36 may cover larger areas than other cells 36, and that overlap between adjacent cells may be expected.

Due to the cell overlap, the side lobes, the position of a subscriber unit relative to a cell's boundary, and other factors understood to those skilled in the art, a mobile unit 24 often can simultaneously receive signals transmitted in more than one cell 36. Generally speaking, a mobile unit 24 is most likely to receive signals transmitted in a cell 36 where the mobile unit 24 is then located, and the likelihood of receiving signals from other cells diminishes as the distance to these other cells increases. However, reflections and side lobes cause exceptions to this general rule.

System 10 (see FIG. 1) communicates through satellites 14 with mobile units 24 (see FIG. 1) using the electromagnetic spectrum. This communication takes place through antenna 32 and beams 34. Those skilled in the art will appreciate the multiple beams 34 formed by antenna 32 define a geometry and do not imply a particular direction of communication. In other words, communications may be transmitted and/or received through the beams 34 projected by antenna 32 toward the earth's surface.

This communication uses only a limited amount of the electromagnetic spectrum. The precise parameters of this spectrum are unimportant to the present invention and may vary from system to system. The preferred embodiments of the present invention divide this spectrum into discrete portions or channel sets. For example, the spectrum may be divided into discrete frequency bands, discrete time slots, discrete coding techniques, or a combination of these. The precise manner of dividing this spectrum is also unimportant to the present invention. Desirably, each of these discrete channel sets is orthogonal to all other channel sets. In other words, simultaneous communications may take place at a common location over every channel set without significant interference. As is conventional in cellular communication systems, the channel sets are assigned to cells 36 through a reuse scheme which prevents adjacent cells 36 from using the same channel sets. However, common channel sets are reused in spaced apart cells 36 to efficiently utilize the allocated spectrum.

In the preferred embodiment of the present invention, a broadcast signal is continually or periodically transmitted from satellite 14 through each beam 34. Each beam's broadcast signal has different parameters than other beams' broadcast signals, and each beam's broadcast signal conveys one or more data messages that carry information identifying the current service area or cell 36 covered by the beam 34, the satellite 14 broadcasting the signal, the ID of the cell 36 with which the beam's broadcast signal is associated, the identity of other channels supported by the beam 34, and/or ringing messages. The identities and frequency, timing, and/or coding parameters of these broadcast signals are known to mobile units 24.

The information which identifies a beam's current service area may take any one of numerous different forms. Regardless of the form, it generally defines the geographical area covered by the beam 34 at the approximate instant the broadcast message is transmitted. In a preferred embodiment, this service area and all other geographic constructs are defined parametrically relative to an earth fixed coordinate system which is known by all system elements. Since satellites 14 move around the earth in their orbits, beams 34 and their corresponding service areas likewise move. Thus, this definition of the service area may change from moment to moment as satellites 14 move.

This service area geographic data may, for example, convey parameters which define the size and position on the surface of the earth of a circle, ellipse, or other regular geometric figure. However, in the preferred embodiment the quantity of data used to define the service area is held to a minimum. For example, the information which identify a beam's current service area may describe only the current point on the surface of the earth at the approximate center of the beam. Mobile units 24 may then simply infer that a service area surrounds this point. In order to further reduce the quantity of data used to define the service area, this point may be described to only a low degree of precision because calculations performed at a mobile unit 24 using this data need not be carried out to a high degree of precision. Thus, this beam-center point may simply refer to a point generally located somewhere in the central region of the beam.

On the surface of the earth a boundary 38 separates a first jurisdiction 40 from a second jurisdiction 42. Any number of boundaries 38 may divide the entire earth's surface into any number of different jurisdictions. Boundaries 38 need not represent physical phenomena of the earth. Rather, boundaries 38 represent lines imposed over the geography of the earth to achieve some of the goals of system 10 (see FIG. 1). Nothing prevents the existence of more than one set of boundaries 38 corresponding to the same sections of the earth. Boundaries 38 may divide the earth into geopolitical jurisdictions, communication service rate jurisdictions, and the like. System 10 qualifies communication services provided to a mobile unit 24 in accordance with the one or more jurisdictions within which the mobile unit 24 currently resides. For example, system 10 may qualify service by denying access in geopolitical jurisdictions where operating licenses have not been obtained, and system 10 may qualify service by assessing charges to calls in accordance with particular rate jurisdictions involved in the calls.

Figure 3:
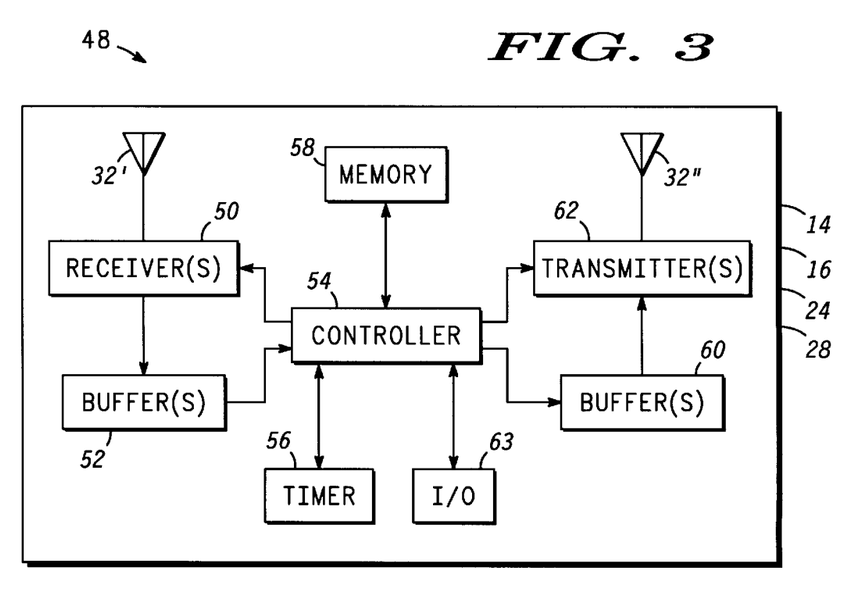
FIG. 3 shows a block diagram of a node of the communication system.

FIG. 3 shows a block diagram of any node 48 of communications system 10 (see FIG. 1). As discussed above, any mobile unit 24, satellite 14, SO 16, or SIM 28 represents a node of system 10. Node 48 includes one or more receivers 50. Receivers 50 couple to an antenna 32' to receive signals from communication links 18, 20, and/or 26 (see FIG. 1). While a mobile unit 24, SO 16, or SIM 28 may include only a single receiver 50, a satellite 14 includes many receivers for simultaneously communicating over numerous different ones of links 18, 20, and 26 (see FIG. 1). Antenna 32' desirably is or includes a multibeam antenna in satellite 14. Receivers 50 couple to receive buffers 52, which temporarily store data received at receivers 50 until these data can be processed.

A processor or controller 54 couples to receive buffers 52 and to receivers 50. Controller 54 couples to receivers 50 to control receive parameters, such as frequency, timing, and the like. Controller 54 additionally couples to a timer 56, a memory 58, transmit buffers 60, and transmitters 62. Controller 54 uses timer 56 to help monitor real time through maintaining the current date and time. Memory 58 includes data which serve as instructions to processor or controller 54 and which, when executed by processor or controller 54, cause node 48 to carry out processes which are discussed below. In addition, memory 58 includes variables, tables, and databases that are manipulated due to the operation of node 48. Desirably, at least a portion of memory 58 is configured as non-volatile read/write memory. Transmit buffers 60 are used to temporarily store data placed therein by controller 54. Controller 54 couples to transmitters 62 to control transmit parameters, such as frequency, timing, and the like. While mobile units 24, SOs 16, and SIMs 28 may include only one transmitter 62, satellites 14 desirably include numerous transmitters 62 for simultaneously communicating over numerous different ones of links 18, 20, and 26 (see FIG. 1). Transmit buffers 60 also couple to transmitters 62. Transmitters 62 transmit signals modulated to carry the data stored in transmit buffers 60. These signals are transmitted through an antenna 32" over links 18, 20, and 26. For satellite 14, antenna 32" is or includes a multibeam antenna. Those skilled in the art will appreciate that antennas 32' and 32" may actually be implemented together using a single antenna.

In earth-based nodes 48, controller 54 also couples to an I/O section 63. In a mobile unit 24, I/O section 63 may include microphones, speakers, digitizers, vocoders, decoders, and the like, to convert between audio and digitized packets that are compatible with system 10 (see FIG. 1). Likewise, I/O section 63 may include a keypad for controlling the operation of mobile unit 24 by a user. In an SO 16 or SIM 28, I/O section 63 may include keyboards, displays, magnetic memory devices, printers, and other devices conventionally coupled to computerized equipment. In an SO 16, I/O section 63 may additionally include components for coupling to a PSTN 22 (see FIG. 1).

In short, each node 48 represents a programmable machine which takes on the character assigned to it by software programming located in memory 58 and executed by processor or controller 54. Since each node 48 or control station, such as satellites 14, SOs 16, and SIMs 28, is or may be in data communication with other control station nodes 48, the precise location and distribution of the processes collectively performed by a control station are less important considerations. From the perspective of a mobile unit 24, system processes may be performed by any node 48 in a control station or may be distributed among several nodes 48.

FIGS. 4 and 6–9 depict processes and memory structures carried out in a mobile unit 24. In the preferred embodiments of the present invention, all mobile units 24 independently perform substantially the same processes. Thus, while the description presented below is directed toward a single mobile unit 24, it generally applies to all members in the population of mobile units 24. Those skilled in the art will appreciate that programming instructions stored in memory 58 (see FIG. 3) of the node 48 that serves as a mobile unit 24 control the processes discussed below in connection with FIGS. 4 and 6–9.

Figure 4:
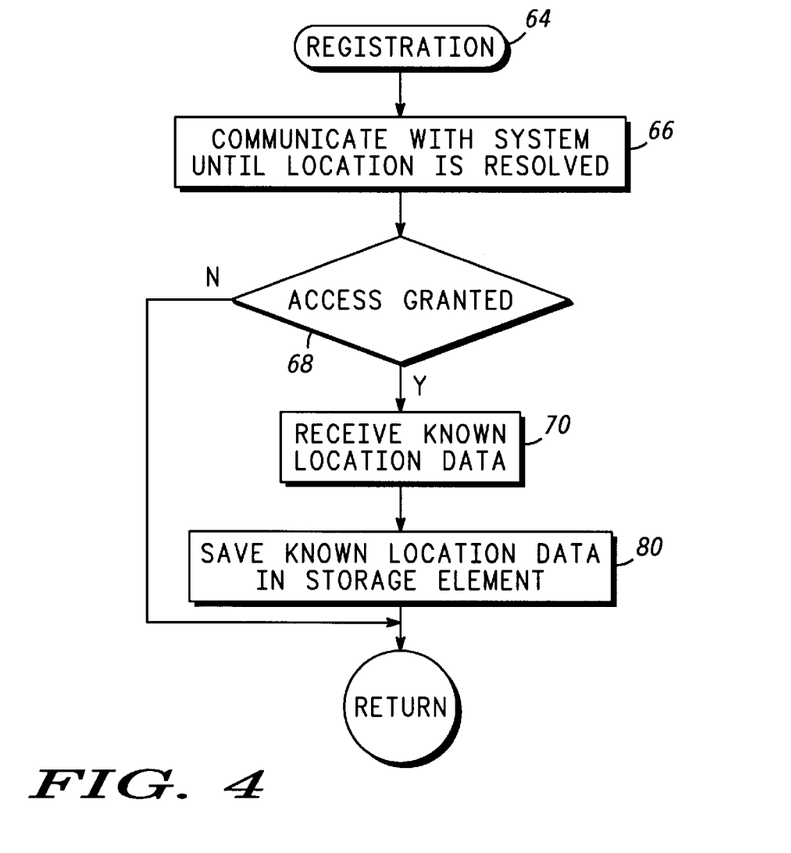
FIG. 4 shows a flow chart of tasks performed by a registration process performed by a mobile unit portion of the communication system.

FIG. 4 shows a flow chart of a registration process 64 performed by mobile unit 24. Generally speaking, registration process 64 informs a control station of the mobile unit's location and allows the control station to prepare for setting up calls to or from the mobile unit 24. Registration process 64 may be performed during call setup, whether the call is an outgoing call or an incoming call. Alternatively, registration process 64 may be performed independently from any call setup operation, as is discussed in more detail below. Upon entering registration process 64, a communication session has already been initiated between mobile unit 24 and a control station.

Registration process 64 performs a task 66 to communicate with a control station until the geographic location of mobile unit 24 has been resolved and communicated to the control station. The present invention does not require that any particular technique be followed in resolving the location of mobile unit 24. For example, mobile unit 24 may include a Global Position System (GPS) receiver, LORAN receiver, or other geo-location receiver so that it can resolve its own location. However, in the preferred embodiment mobile unit 24 does not resolve its own location. Rather, Doppler and propagation delay measurements are made of signals communicated between mobile unit 24 and a control station, and the control station processes these measurements to determine the mobile unit's location. Since a control station determines the mobile unit's location, the mobile unit need not include the complexity of location determination equipment, and mobile unit complexity and costs are reduced.

After task 66, a query task 68 determines whether a control station has granted access to the communication services offered by system 10 (see FIG. 1). This determination may be made by examining a data code sent to mobile unit 24 from the control station. If this data code indicates that access is not granted, program control may exit registration process 64. The system may refuse to grant access when, for example, a mobile unit's location is determined to be in an unauthorized geopolitical jurisdiction.

When task 68 determines that access is granted, a task 70 receives "known location" data from a control station. The known location data describe the location that the control station knows for mobile unit 24. It represents the location for mobile unit 24 at the time that registration process 64 is performed. However, mobile unit 24 is free to move away from this location at any time. The known location data are obtained in a data message from the control station.

Figure 5:
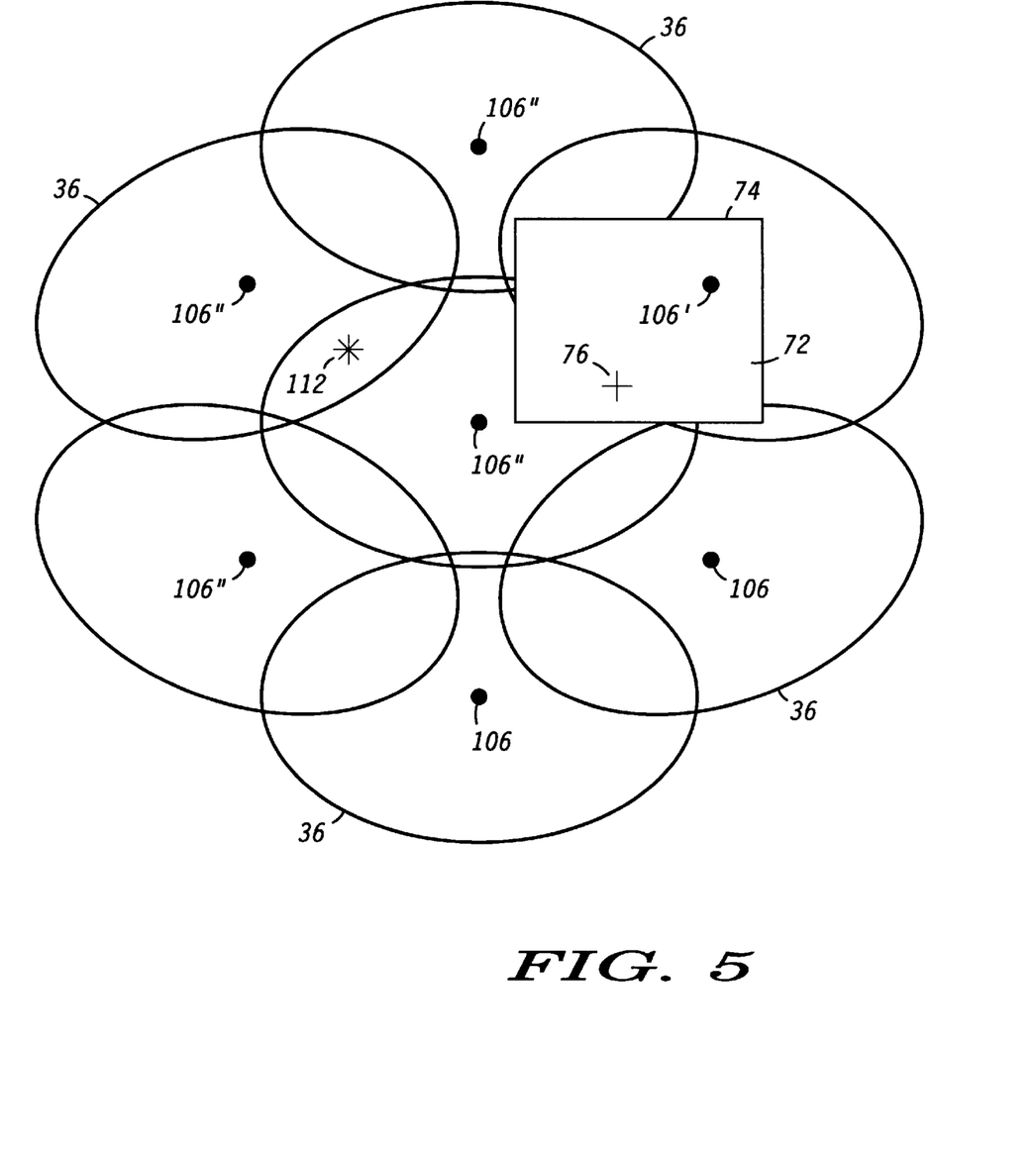
FIG. 5 shows a representation of a few cells from the cellular pattern relative to a target area.

Desirably, the known location for mobile unit 24 does not simply identify a geographic point but defines a target area within whose boundaries mobile unit 24 resides during the performance of registration process 64. FIG. 5 shows a schematic representation of a few of cells 36 relative to an exemplary target area 72 that is surrounded by a boundary 74. While the service areas of cells 36 may move over the earth in response to the movement of satellites 14, target area 72 remains relatively stationary. Target area 72 may be interpreted by system 10 as the area for which a control station can efficiently and reliably operate relative to the mobile unit 24. In accordance with the preferred embodiments of the present invention, mobile unit 24 does not directly determine whether it is inside or outside of target area 24. Rather, mobile unit 24 uses target area 72 as a tool for determining when to automatically register with a control station.

FIG. 5 illustrates target area 72 as being a rectangle, which the known location data may define through coordinates for opposing corners. However, other shapes may be used as well. For example, the known location data may define coordinates of a circle's center and a radius. Alternatively, the known location data may specify parameters for an ellipse or other geometric shape. Preferably, the geometric shape of target area 72 is one that can be clearly defined through a small amount of data so that system resources and processing power are not wasted communicating and processing complicated shapes.

The known location data may simply describe a known point 76 where mobile unit 24 resides. Mobile unit 24 may then assume that target area 72 surrounds known point 76 in a predetermined manner. However, greater flexibility is provided by defining a specific target area that may change from region to region and time to time. The broadcast message can contain the current local general rules for determining the target area 72 which the mobile unit applies when it receives its known location. Thus, the shape and size of target areas 72 may vary in accordance with proximity to a jurisdiction boundary 38 (see FIG. 2) or with current system requirements for balancing the frequency of automatic registration processes, discussed below, against delays, system overhead, and low call completion rates that might result from the use of stale location data. As illustrated in FIG. 5, known point 76 depicts an exemplary exact location for a mobile unit 24. Known point 76 need not be limited to being in a particular place within target area 72 but may reside anywhere.

Figure 6:
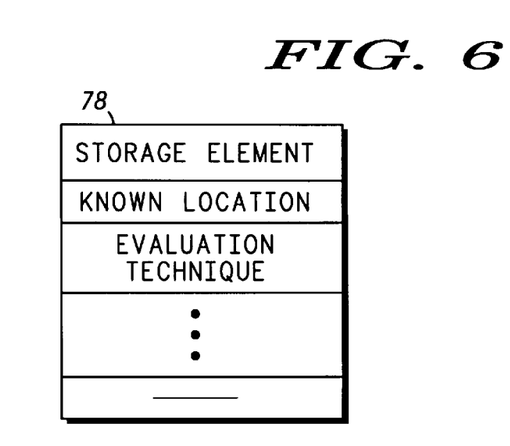
FIG. 6 shows a representation of a storage element maintained in a memory portion of the mobile unit.

FIG. 6 shows a representation of a storage element 78 maintained in a non-volatile, read/write portion of memory 58 (see FIG. 3). Referring to FIGS. 4 and 6, when task 70 receives the known location data, a task 80 saves the known location data in storage element 78. As discussed above, this data may define a target area 72 (see FIG. 5) and/or its boundaries 74.

The known location data may be accompanied by evaluation technique data, which task 80 also saves in storage element 78. The evaluation technique data improves flexibility in programming the population of mobile units 24 for deciding when to automatically initiate registrations and thereby consume system resources handling the registration communications. For example, the evaluation data may inform mobile unit 24 of how to interpret the known location data, such as a center and radius of a circle, opposing corners of a box, ellipse axes, and the like. In addition, the evaluation data may instruct mobile unit 24 how to interpret service area geographic data broadcast through beams 34 (see FIG. 2). This programmability feature allows system operators to vary shapes and sizes of target areas 72 (see FIG. 5) along with service area definitions and evaluation techniques as needed to maintain a desirable balance between too few and too many automatically initiated registrations.

Of course, those skilled in the art will appreciate that other data, such as mobile unit programming parameters, may also be transferred to and from mobile unit 24 during registration 64. After task 80 and such other transferring tasks (not shown), program control returns to the process that called registration process 64. These processes may relate to call setup (not shown) or to a standby foreground process, discussed below in connection with FIG. 9.

Figure 7:
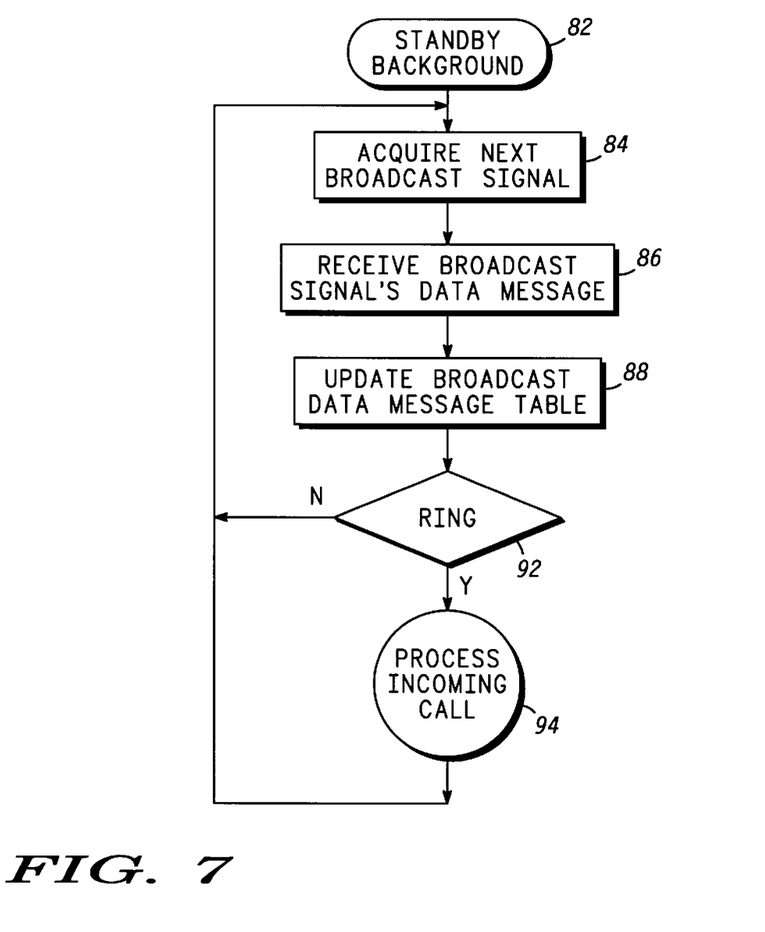
FIG. 7 shows a flow chart of tasks performed by a standby background process performed by the mobile unit.

FIG. 7 shows a flow chart of a standby background process 82 performed by mobile unit 24. In general, during a standby mode, mobile unit 24 is powered up, is monitoring communications from a control station for a ringing signal that indicates an incoming call, and is monitoring its I/O section 63 to determine if the user is instructing it to make an outgoing call. Standby background process 82 continually operates when mobile unit 24 is in the standby mode.

Standby background process 82 repetitively acquires and monitors as many broadcast signals as it can receive. As discussed above, broadcast signals are transmitted from control stations, and particularly satellites 14, in each cell 36 (see FIG. 2). During a task 84 in process 82, mobile unit 24 acquires a next broadcast signal. In other words, mobile unit 24 acquires some broadcast signal which is preferably different from the last broadcast signal it monitored. However, if mobile unit 24 can receive only one broadcast signal, the signal acquired in task 84 will not be different from the last broadcast signal.

After task 84, a task 86 receives the broadcast signal's data message. As discussed above, this data message may convey, for example, information identifying the current service area covered by the beam 34 (see FIG. 2), the satellite 14 (see FIGS. 1–2) broadcasting the signal, the ID of the cell 36 with which the beam's broadcast signal is associated, the identity of other channels supported by the beam 34, and/or ringing messages. After task 86 monitors the broadcast signal's data message, a task 88 updates a broadcast data message table 90 with data from the broadcast data message.

Figure 8:
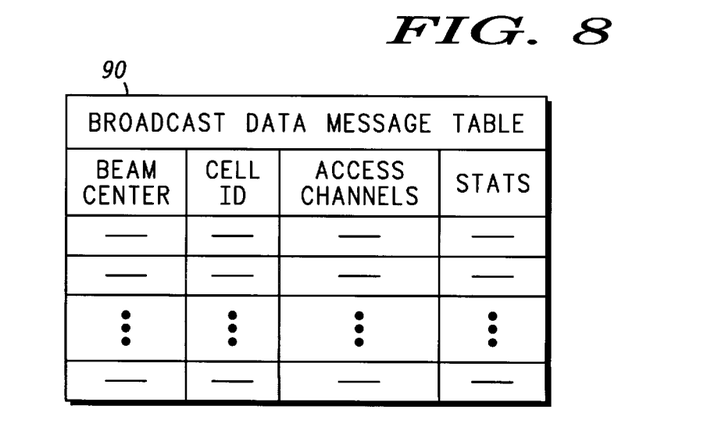
FIG. 8 shows a representation of a broadcast data message table maintained in the memory of the mobile unit.

FIG. 8 shows a representation of broadcast data message table 90, which is maintained in memory 58. For the various broadcast signals receivable by mobile unit 24, table 90 records the beam center or other service area definition data, cell ID, access channel identities usable to engage in communications through the service area's beam 34 (see FIG. 2), and various statistics. The statistics may include a time stamp identifying the instant in time at which the data message was received, broadcast signal characteristics, and number of times for which or duration over which the broadcast signal has been received. These statistics may be updated as needed by task 88 to remain current.

After task 88, a query task 92 determines whether a ringing signal was broadcast to the mobile unit 24. The ringing signal may be configured as a ring signal data code and a mobile unit's serial number or other identification number. If mobile unit 24 recognizes both the ring signal data code and its own identification number, then a ringing signal has been detected. When ringing is detected, program control leaves the standby mode, and an incoming call process 94 is performed. Conventional sequences for handling incoming calls, as known to those skilled in the telephony arts, are performed to handle the incoming call.

After completion of incoming call process 94 or when task 92 fails to detect a ringing signal, program control loops back to task 84. Program control remains in a loop that includes tasks 84, 86, 88, and 92 so long as mobile unit 24 remains in its standby mode. Mobile unit 24 tracks the movement of service areas through this looping operation. Broadcast data message table 90 is updated in each iteration of the loop to keep its data current.

Figure 9:
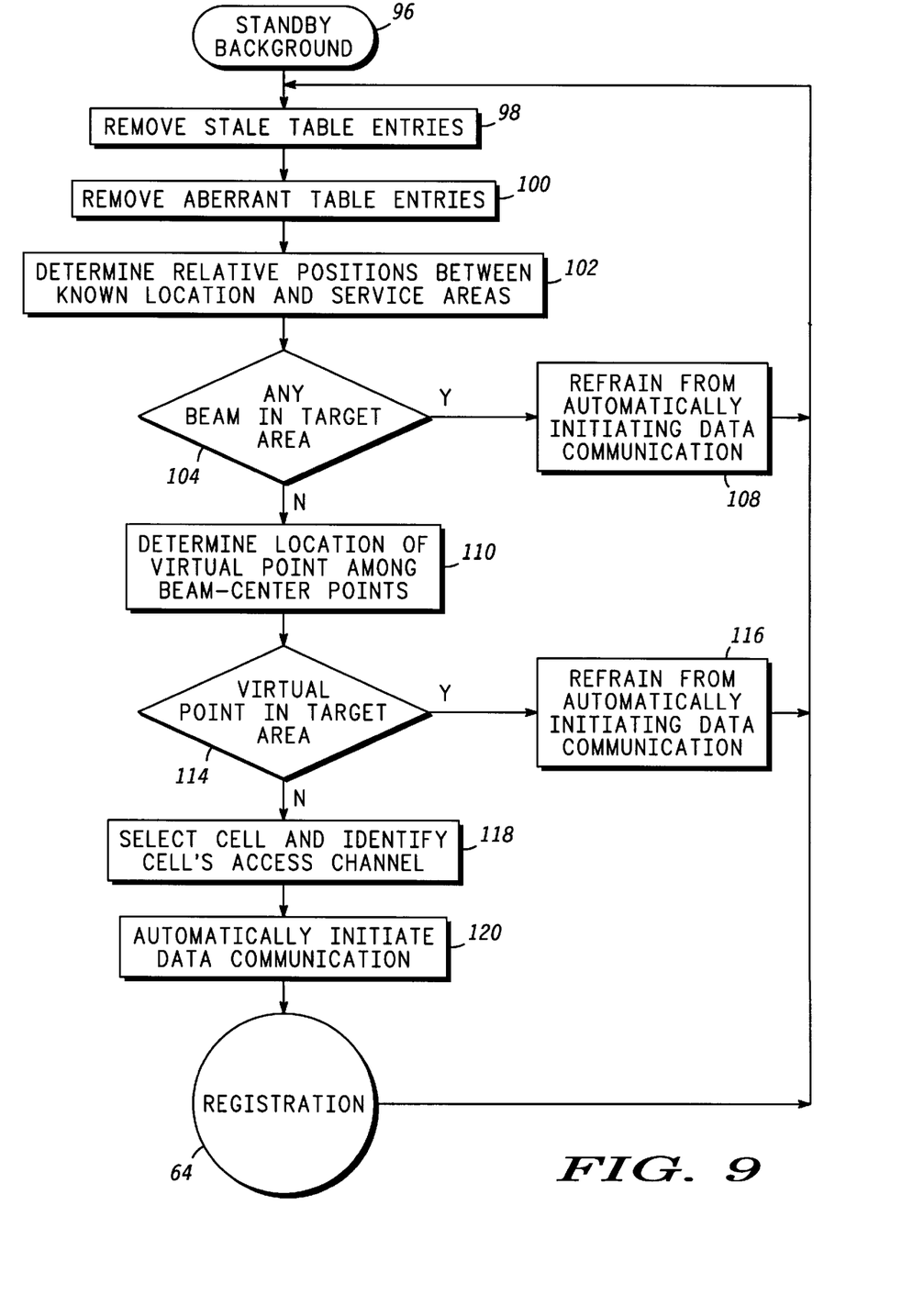
FIG. 9 shows a flow chart of tasks performed by a standby foreground process performed by the mobile unit.

FIG. 9 shows a flow chart of a standby foreground process 96 performed by mobile unit 24. Standby foreground process 96 continually operates when mobile unit 24 is in its standby mode. Preferably, standby foreground process 96 operates while standby background process 82 (see FIG. 7) is also in progress. Generally speaking, standby foreground process 96 processes the information in broadcast data message table 90 (see FIG. 8) to decide whether to automatically initiate registration.

Standby foreground process 96 performs a task 98 to remove any stale entries from broadcast data message table 90 (see FIG. 8). Thus, the remaining records in table 90 should carry current data. Stale entries may be identified by examining time stamp statistics for the records.

After task 98, an optional task 100 removes aberrant entries from table 90. Aberrant entries may result from side lobes of beams 34 (see FIG. 2) or reflections. They may be identified as the entries in table 90 that have a cell ID which is not located near the other cell IDs in table 90, relative to the cell positioning scheme in footprint 30 (see FIG. 2). In other words, a cell 36 (see FIG. 2) that is too far removed from the majority of cells 36 listed in table 90 may be declared aberrant and discarded. Task 100 is an optional task because such aberrant entries most likely quickly become stale and get removed by task 98. After tasks 98 and 100, table 90 contains data which are assumed to be valid and current.

After tasks 98 and 100, a task 102 determines relative positions between the known location and the service areas. The known location was obtained above in task 70 (see FIG. 4) and saved in storage element 80 (see FIG. 6). This known location desirably defines target area 72 (see FIG. 5). At the time task 102 is performed, the precise location of mobile unit 24 is unknown, and mobile unit 24 may or may not reside in target area 72. Task 102 is not directly concerned with the location of mobile unit 24. Rather, task 102 compares the known location with the cells 36 (see FIG. 2) for the service area locations specified in table 90 (see FIG. 8). Relative positions may be determined for each service area entry in table 90.

After task 102, a query task 104 determines whether any of the beams 34 (see FIG. 2) associated with the cells 36 listed in table 90 are in target area 72 (see FIG. 5). In other words, task 104 determines whether any cell's service area coincides with target area 72.

Process 96 may use any of a wide variety of algorithms to identify coincidence between cells 36 and target area 72. In the above-discussed preferred embodiment where beam-center points are communicated in broadcast data messages, task 104 may determine whether any beam-center point listed in table 90 resides within target area 72.

Referring back to FIG. 5, several beam-center points 106 are illustrated. Beam-center points 106 reside in the central regions of cells 36. In the exemplary situation depicted in FIG. 5, the one of beam-center points 106 labeled as point 106' resides in target area 72. For this exemplary situation, if mobile unit 24 could acquire and receive the broadcast signal for the cell 36 which has beam-center point 106', task 104 (see FIG. 9) would conclude that one of beams 34 (see FIG. 2) is in target area 72. Task 104 would reach this same conclusion no matter how many other broadcast signals it can currently receive. For mobile unit 24 to be able to do this, it needs to be located somewhere around target area 72.

On the other hand, if mobile unit 24 has moved away from target area 72, then the broadcast signals it can receive probably have different beam-center points 106. If, for example, mobile unit 24 can receive only the four beam center points labeled 106" in FIG. 5, then task 104 may conclude that none of beams 34 is in target area 72.

The coincidence determination carried out by task 104 is not required to operate on precise and accurate data. As illustrated by FIG. 5, task 104 may conclude that coincidence exists even though mobile unit 24 cannot receive broadcast signals assigned to a collection of cells 36 that cover the entirety of target area 72. Conversely, task 104 may conclude that coincidence does not exist even though mobile unit 24 can receive a broadcast signal assigned to a cell 36 that covers at least a portion of target area 72. Imprecision and low accuracy may be tolerated because the coincidence determination is used in managing automatically initiated communications, not in directly determining location. More precise location determination may be accomplished through registration once communication has been automatically initiated. If too few or an excessive number of automatic registrations are taking place, then target area definitions, service area definitions, and evaluation techniques may be reprogrammed to cause the population of mobile units 24 to make more or fewer automatic registrations.

It will be understood by one of ordinary skill in the art that task 104 is optional and that the process could proceed directly to task 110 if, for example, the target areas are smaller than the beams.

Referring back to FIG. 9, when task 104 determines that at least one beam 34 (see FIG. 2) is in target area 72 and that coincidence between some service area listed in table 90 (see FIG. 8) and target area 72 exists, a task 108 is performed. Task 108 causes mobile unit 24 to refrain from automatically initiating a data communication with a control station. After task 108, program control loops back to task 98 to re-evaluate the data in table 90. This data may have been updated through the operation of standby background process 82 (see FIG. 7). Thus, the re-evaluation tracks movement in cells 36 and movement by mobile unit 24.

When task 104 determines that no beam 34 is in target area 72 and that no coincidence between target area 72 and the service areas listed in table 90 exists, a task 110 is performed. Task 110 determines the location of a virtual point among the beam-center points listed in table 90. Referring back to FIG. 5, an exemplary situation which produces virtual point 112 is illustrated. In this exemplary situation, a mobile unit 24 receives only the broadcast signals that convey beam-center points 106". Virtual point 112 desirably resides in the center of beam-center points 106". A conventional triangulation or center-of-gravity calculation algorithm may be performed to locate virtual point 112. However, the precise algorithm is not important, and the location of virtual point 112 need not be described to a great degree of precision. In other words, any algorithm which describes a virtual point's location as being somewhere in the middle of the collection of service areas is sufficient.

Point 112 is considered a "virtual" point because it is a mathematical construction that need not correspond to the current location of mobile unit 24. However, mobile unit 24 probably resides somewhere around virtual point 112, given the fact that it can receive the beams 34 from which this location is derived. In the example depicted in FIG. 5, virtual point 112 does not reside in target area 72, indicating that the mobile unit has moved a substantial distance in the time since it last registered and received location data 76.

However, in other situations virtual point 112 might reside in target area 72. For example, when mobile unit 24 resides in target area 72, the beam-center points 106 receivable at mobile unit 24 may reside outside target area 72. In this situation, a good chance exists that virtual point 112 will fall in target area 72.

Referring back to FIG. 9, after task 110 determines the location of virtual point 112 (see FIG. 5), a query task 114 determines whether virtual point 112 resides in target area 72. If so, a task 116 causes mobile unit 24 to refrain from automatically initiating a data communication with a control station. After task 116, program control loops back to task 98 to re-evaluate the data in table 90 (see FIG. 8).

When task 114 determines that virtual point 112 does not reside in target area 72, a task 118 selects a cell 36 to use for communication with a control station. In other words, task 118 selects one entry from table 90 (see FIG. 8). The parameters used in making this selection are not important and may include an examination of power levels or other statistics listed in table 90. In addition, task 118 identifies the access channel to use in transmitting signals to a control station. This access channel is identified from table 90.

After task 118, a task 120 automatically initiates data communication with a control station. In other words, mobile unit 24 transmits signals to a control station over the access channel. The transmission occurs when processor or controller 54 activates transmitter 62 (see FIG. 3) in mobile unit 24. Once communication has been initiated, standby foreground process 96 performs registration process 64, discussed above in connection with FIG. 4. Registration is automatically initiated without reliance on any human activity, such as the chance occurrence of an outgoing or incoming call. Rather, mobile unit 24 automatically initiates data communication with a control station in response to relative positions between broadcast signal service areas and target area 72 (see FIG. 5). Registration process 64 will then allow system 10 to update its knowledge of the mobile unit's location and will re-program mobile unit 24 with a new target area definition. Upon completion of registration process 64, program control loops back to task 98 to evaluate the data currently contained in table 90 (see FIG. 8) in comparison to the new target area definition.

Figure 10:
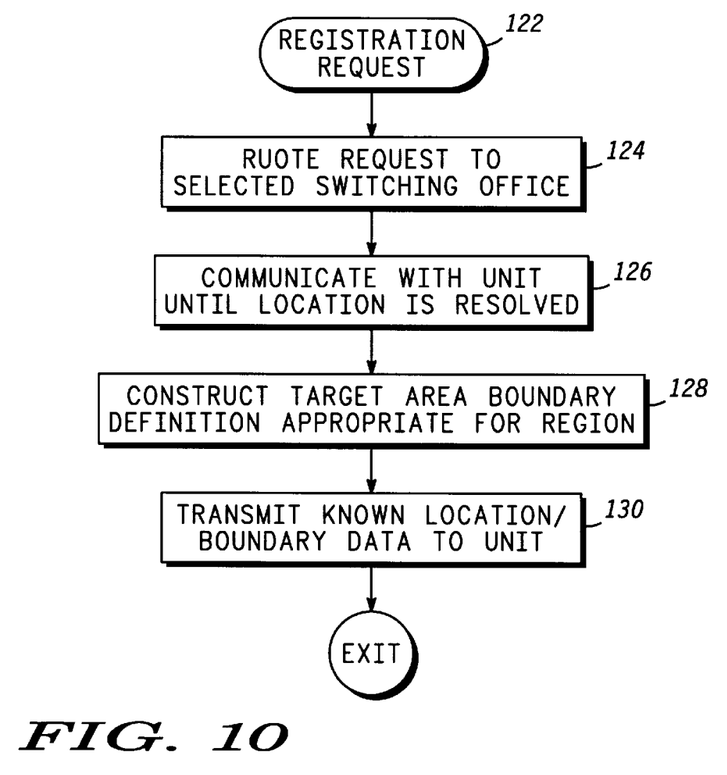
FIG. 10 shows a flow chart of tasks performed by a registration request process performed by system components of the communication system.
Figure 11:
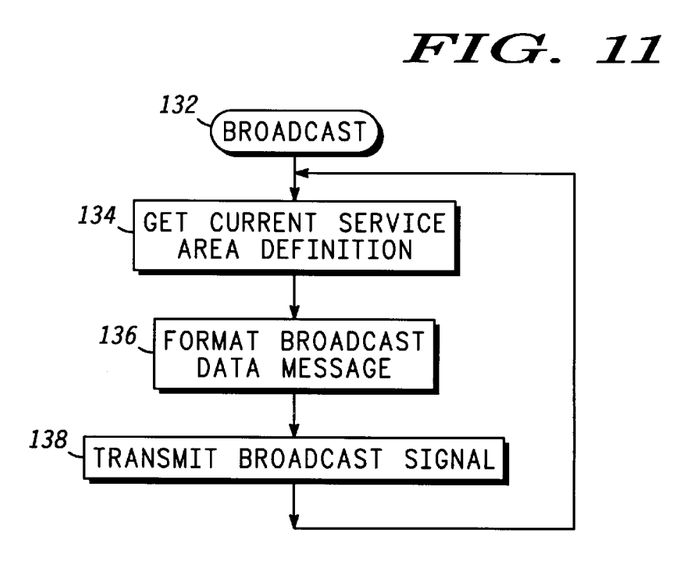
FIG. 11 shows a flow chart of tasks performed by a broadcast process performed by the system components.

FIGS. 10–11 depict processes carried out by a control station. As discussed above, a control station may include many different nodes 48 (see FIG. 3), such as satellites 14, SOs 16, and SIMs 28, and these nodes 48 are or may be in data communication with each other. Thus, the processes depicted in FIGS. 10–11 may be carried out in any one or more of control station nodes 48. Those skilled in the art will appreciate that programming instructions stored in memories 58 (see FIG. 3) of the nodes 48 that serve as control stations control the processes discussed below in connection with FIGS. 10–11.

FIG. 10 shows a flow chart of a registration request process 122 performed by a control station. Generally speaking, registration request process 122 handles registration of a mobile unit 24 for a control station. Registration request process 122 may be performed whenever a control station receives a data communication from a mobile unit 24. As discussed above, the registrations may occur as part of a call setup process for an incoming or outgoing call, or they may occur automatically.

Upon entering registration request process 122, a task 124 routes a registration request message to an appropriate switching office (SO) 16 (see FIG. 1) or control station. The duration required for task 124 may vary from situation to situation. This duration may be short if the request can be routed to the same SO 16 which handled the previous registration for the mobile unit 24. In this situation, that SO 16 already has the mobile unit's record on file. On the other hand, this duration may be longer if the request is routed to a different SO 16 than handled the previous registration. In this situation, the SO 16 may need to request the mobile unit's record from the mobile unit's home SIM 28 (see FIG. 1) and possibly perform other setup operations. In order to keep subscribers from having to experience long waits while a control station performs task 124 in connection with call setup-initiated registrations, the above-discussed programming that adjusts the frequency of automatic registrations, desirably results in as high a frequency of automatic registrations as can be tolerated because subscribers are typically not aware of delays associated with task 124 during automatic registrations.

After task 124, a task 126 causes the control station to engage in communications with the mobile unit 24 until a location for the mobile unit 24 has been resolved. Task 126 complements task 66, discussed above in connection with FIG. 4. After task 126, a task 128 constructs a definition for the known location of the mobile unit. This definition may vary the size and shape of target area 72 (see FIG. 5) depending upon the mobile unit's current location and upon current system needs for increasing or decreasing the number of automatic registrations being experienced by a control station. After task 128, a task 130 transmits the known location data, which define target area 72 and boundary 74 (see FIG. 5), to the mobile unit 24. Of course, other data may also be communicated between the mobile unit 24 and a control station during task 130. Task 130 complements task 70, discussed above in connection with FIG. 4. After task 130, program control exits registration request process 122. Process 122 will be re-executed when another request for registration is received from the same or another mobile unit 24.

FIG. 11 shows a flow chart of a broadcast process 132 performed by a control station. Broadcast process 132 is performed for each beam 34 (see FIG. 2) supported by system 10. Broadcast process 132 handles the transmission of the broadcast signal which system 10 assigns to each cell 36 (see FIG. 2). Process 132 may be performed in a continuous loop for each beam 34, so that geographic data which define a cell's service area on the surface of the earth, such as beam-center point coordinates 106 (see FIG. 5), track the movement of cells 36.

Broadcast process 132, performs a task 134 to obtain a current service area definition. The service areas provided by cells 36 follow the movement of satellites 14 (see FIGS. 1–2) in their orbits around the earth. This movement and the corresponding movement of service areas are predictable and may be calculated in advance. Thus, task 134 may desirably calculate service area definitions, such as beam-center point 106 (see FIG. 5) coordinates, in advance, and then perform a table look-up operation using the current time as a table index to obtain a current service area definition.

After task 134, a task 136 formats the broadcast data message. This data message may convey several different data elements, including the location of the current service area or cell 36 covered by the beam 34 (see FIG. 2), the identity of the satellite 14 broadcasting the signal, the identity of other channels supported by the beam 34, and the ID of the cell 36 with which the beams broadcast signal is associated, and/or ring messages. These data elements are collected and appropriately formatted for transmission. After task 136, a task 138 transmits the broadcast signal to convey the broadcast data message. After task 138, program control loops back to task 134 to repeat the broadcast.

In summary, the present invention provides an improved method and apparatus for managing automatically initiated communications. Communications are automatically initiated on occasion by mobile units to perform a registration process. The determination of whether or not to engage in an automatic registration is based upon location data. System components broadcast location information from time to time, and the mobile units monitor the broadcasts to determine whether the system's old location knowledge remains valid. Parameters which define locations and related areas may be changed from situation to situation to increase or decrease the frequency with which a population of mobile units engage in automatic registrations. Since the mobile units are not required to determine their own locations, the mobile units can be less complex and less costly.

The present invention has been described above with reference to preferred embodiments. However, those skilled in the art will recognize that changes and modifications may be made in these preferred embodiments without departing from the scope of the present invention. For example, the present invention need not be restricted to use only in connection with a moving-satellite-based cellular communication system. Those skilled in the art may easily adapt the teaching of the present invention to any satellite-based or land-based communication system which may broadcast service area location data from stationary transmitters. Moreover, those skilled in the art will appreciate that the flow charts presented herein are intended to teach the present invention and that different techniques for implementing program flow that do not necessarily lend themselves to flowcharting may be devised. In particular, each task discussed herein may be interrupted to permit program flow to perform background or other tasks. In addition, the specific order of tasks may be changed, and the specific techniques used to implement the tasks may differ from system to system. These and other changes and modifications which are obvious to those skilled in the art are intended to be included within the scope of the present invention.

What is claimed is:

1. A method of operating a mobile unit to determine when to automatically initiate communications with a control station, said method comprising the steps of:

receiving data describing a known location for said mobile unit, said known location being described relative to a position of said mobile unit and not relative to geographic descriptions of cell locations;

interpreting said data describing a known location for said mobile unit as a target area within which said mobile unit resides during said receiving step;

monitoring a plurality of broadcast signals, wherein each of said plurality of broadcast signals is assigned to its own service area and each broadcast signal conveys data identifying a point centrally located in its own service area;

determining the location of a virtual point which is centrally located, among said points in the centers of said plurality of service areas, said virtual point being calculated from said points and defining a reference location;

refraining from automatically initiating said data communication from said mobile unit when said virtual point resides in said target areas; and otherwise initiating data communication from said mobile unit in response to said determining step.

2. A method of operating a mobile unit to determine when to automatically initiate communications with a control station, said method comprising the steps of:

receiving data describing a known location for said mobile unit, said known location being described relative to a position of said mobile unit and not relative to geographic descriptions of cell locations;

interpreting said data describing a known location for said mobile unit as a target area within which said mobile unit resides during said receiving step;

monitoring a broadcast signal said broadcast signal conveying geographic data describing a service area to which said broadcast signal is assigned, wherein said monitoring step monitors a plurality of broadcast signals, each of said plurality of broadcast signals is assigned to its own service area, and each broadcast signal conveys data identifying a beam-center point centrally located in its own service area;

determining the location of a virtual point which is centrally located among said beam-center points; and initiating data communication from said mobile unit in response to said determining step when said beam-center points reside outside said target area and said virtual point resides outside said target area.

3. In a communication system in which a control station engages in data communications with members of a population of mobile units from time to time, a method of managing automatically initiated data communications comprising the steps of:

transmitting data describing a known location for one of said mobile units to said one mobile unit, said known location being described relative to a position of said mobile unit and not relative to geographic descriptions of cell locations;

interpreting said data describing a known location for said one mobile unit as a target area within which said one mobile unit resides during said transmitting step;

broadcasting data messages to different geographical areas, said data messages conveying data which describe locations for service areas to which said data messages are being broadcast, said service areas being in motion in relation to said mobile units, and said data which describe locations for service areas to which said data messages are being broadcast are interpreted as identifying beam-center points which are centrally located in said service areas;

receiving one of said broadcast data messages at said one mobile unit, wherein said receiving step is configured so that said one mobile unit monitors as many of said broadcast data messages as it can acquire;

determining, at said one mobile unit, the location of a virtual point which is centrally located among at least a portion of said beam-center points, said virtual point being calculated from said points and defining a reference location;

refraining from automatically initiating said data communication from said one mobile unit when said virtual point resides in said target area; and otherwise automatically initiating said data communication from said mobile unit in response to said determining step.

4. A method of managing automatically initiated data communications as claimed in claim 3 wherein said automatically initiating step automatically initiates said data communication from said one mobile unit when said beam-center points reside outside said target area and said virtual point resides outside said target area.

5. A mobile communication unit that automatically initiates communication with a control station from time to time for conserving communication system resources, said mobile unit comprising:

a receiver configured to receive data describing a known location for said mobile unit and a broadcast signal which conveys geographic data describing a service area to which said broadcast signal is assigned, said known location being described relative to a position of said mobile unit and not relative to geographic descriptions of cell locations, wherein a plurality of broadcast signals are broadcast to a corresponding plurality of service areas, and each of said plurality of broadcast signals conveys data describing a geographic service area to which each broadcast signal is assigned, and said receiver is controlled by a processor to acquire as many of said plurality of broadcast signals as possible;

a storage element coupled to said receiver, said storage element being configured to retain said known location data;

said processor coupled to said receiver and said storage element, said processor being configured to determine a position of said known location relative to said service area, wherein said processor is configured to interpret said data describing said known location for said mobile unit as a boundary of a target area within which said mobile unit resides when said data describing said known location is received, said processor is configured to interpret said data describing each service area as being coordinates of a beam-center point centrally located in each service area, said processor is configured to determine relative positions between said target area and said beam-center points, said processor is configured to determine the location of a virtual point which is centrally located among said beam-center points, said virual point being calculated from said points and defining a reference location, and said processor is further configured to refrain from automatically initiating said data communication from said mobile unit when said virtual point resides in said target area; and a transmitter coupled to said processor, said transmitter being activated under control of said processor to automatically initiate data communication from said mobile unit in response to said relative position, said transmitter also cooperatively generating said known location with said control station.

6. A mobile communication unit as claimed in claim 5 wherein said processor is configured to initiate said data communication from said mobile unit when said beam-center points reside outside said target area and said virtual point resides outside said target area.

* * * * *